United States Patent [19]

Forster

[11] 4,396,331
[45] Aug. 2, 1983

[54] BALE FEEDING ATTACHMENT FOR A LARGE ROUND BALE HANDLING MACHINE

[76] Inventor: Harold G. Forster, Box 16, Site 2, R.R. 5, T2P 2G6 Calgary, Alberta, Canada

[21] Appl. No.: 324,841

[22] Filed: Nov. 25, 1981

[51] Int. Cl.³ ............................................. A01D 90/12
[52] U.S. Cl. .............................. 414/24.6; 242/86.5 R; 414/459
[58] Field of Search ..................... 414/24.5, 24.6, 911, 414/458, 459; 242/86.5 R, 86.52

[56] References Cited

U.S. PATENT DOCUMENTS

| | | | |
|---|---|---|---|
| 2,959,310 | 11/1960 | Meister, Jr. ........................ | 414/459 |
| 3,861,616 | 1/1975 | Dubberke .................. | 242/86.5 R X |
| 4,025,006 | 5/1977 | Turnbow ...................... | 242/86.5 R |
| 4,072,241 | 2/1978 | Parker et al. ................... | 414/459 X |
| 4,161,253 | 7/1979 | Ralston et al. .................. | 414/911 X |

FOREIGN PATENT DOCUMENTS 1086688 9/1980 Canada ............................... 414/24.5

*Primary Examiner*—Robert J. Spar
*Assistant Examiner*—Janice Krizek
*Attorney, Agent, or Firm*—Rudolph L. Lowell

[57] ABSTRACT

The bale feeding attachment is mountable on a machine for handling large round bales that has a vertically adjustable elongated main frame including a pair of transversely spaced side structures, each of which has a longitudinal ramp member. The ramp members are movable with the frame to lowered positions at opposite side portions of a ground supported bale and engageable, on elevation of the frame, with the bale side portions to support the bale for transport. The attachment includes a pair of laterally extendible and retractable bale supporting units, each of which, when retracted, is pivotally movable on an associated side structure to an inoperative position permitting a normal use of the bale handling machine. When a bale is in a transport position, between the supporting units, the supporting units are pivotally moved and laterally extended to move bale feeding rollers thereon into bale holding positions, free of the machine ramp members. On rotation of the bale feeding rollers and advance of the machine, the bale is rotated and the material removed therefrom by the rollers is loosely dispersed in a continuous windrow extended rearwardly from the machine.

8 Claims, 9 Drawing Figures

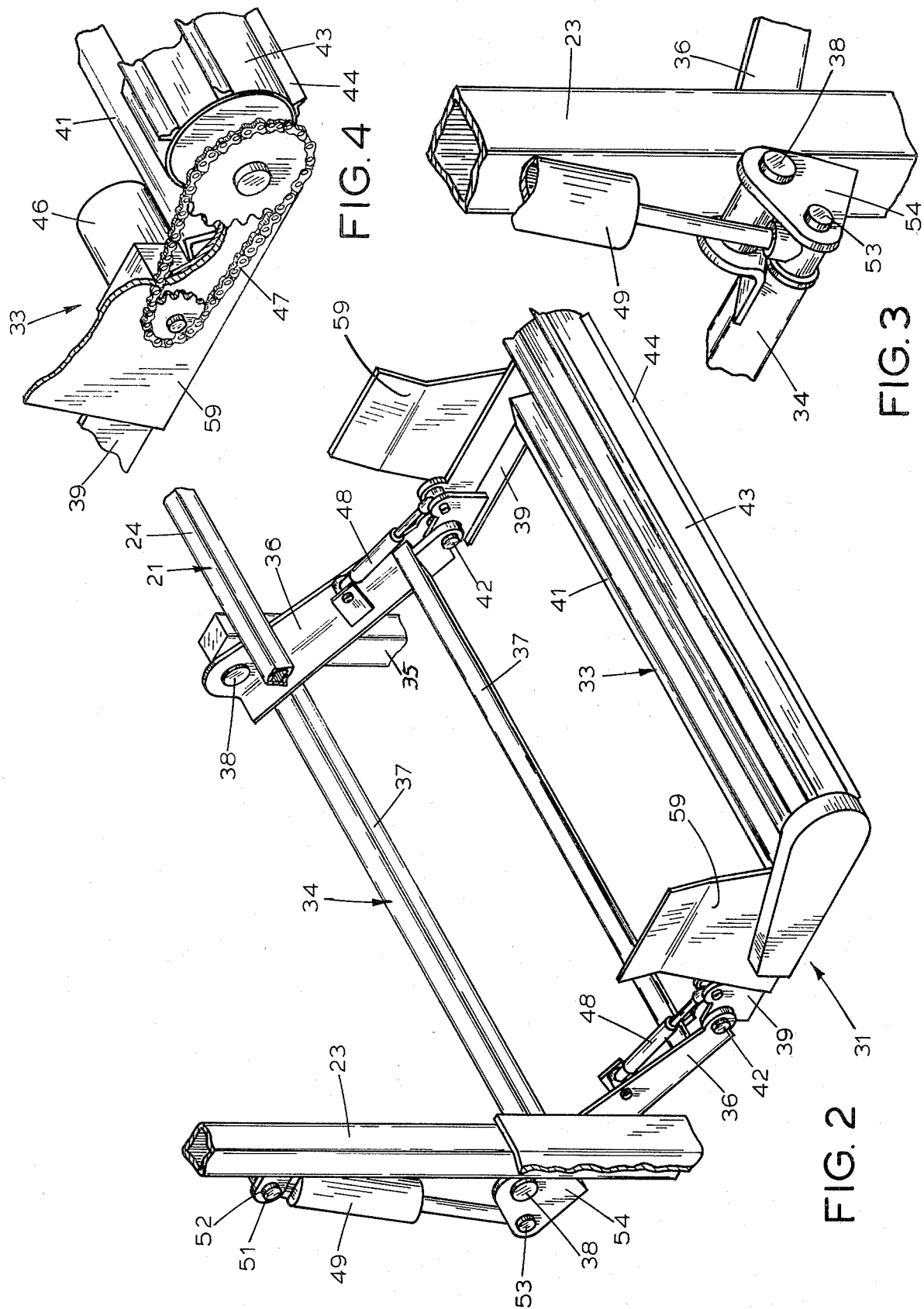

4,396,331

BALE FEEDING ATTACHMENT FOR A LARGE ROUND BALE HANDLING MACHINE

BACKGROUND OF THE INVENTION

In the feeding of large round bales, such has been done by standing the bale on end within an open frame enclosure through which the feeding livestock are able to pull the bale apart, while being prevented from stomping on fallen hay around the bale. Also, tractor mounted bale handing means have been used to rotatably support a bale in a manner to be rolled out on the ground for pick up by feeding livestock. In other instances, the round bale has been fed into tractor operated bale shredders, some of which were towed through a feeding area for discharging the shredded hay along the ground.

In U.S. Pat. No. 4,053,071, a bale loading and transport machine is equipped with an outboard bale disintegrating unit which drops the material into a continuous stream on the ground or into a feed bunk. The bales can be transported end to end to a feeding location and then successively transferred to the disintegrating unit as the machine is advanced.

Applicant's bale feeding attachment is adapted to be mounted on bale handling machines such as shown in U.S. Pat. Nos. 4,076,137 and 4,204,790. When the attachment is not in use, it is movable to a rest or storage position providing for a normal use of the machine for road travel and bale loading and transport purposes.

SUMMARY OF THE INVENTION

The bale feeding attachment of this invention is of a simple, and economical construction and readily mounted on a bale handling machine wherein a pair of transversely spaced ramp or bale engaging members are initially movable to engage opposite side portions of a ground supported bale and then elevated to support the bale for transport. The attachment comprises a pair of like bale supporting units, each of which extends longitudinally along a side of the machine and is retractable and extendible laterally of the machine. When a bale is supported in a transport position, the bale supporting units of the attachment are laterally extended so that rollers at the adjacent inner sides thereof are moved to engage and support the bale at positions above the ramp members. On rotation of the rollers and advance of the machine, the bale is unrolled and fed between the ramp members so that unrolled material falls to the ground to form a continuous row of loose dispersed material for feeding purposes. The bale feeder attachment may remain mounted at all times on the bale handling machine since it is readily movable to an inoperative position that does not interfere with a normal efficient operation of the bale handling machine for bale loading and transport purposes.

DESCRIPTION OF THE DRAWINGS

FIG. 2 is an enlarged perspective view of one of the like pairs of bale supporting units of the attachment shown mounted on an associated side structure of the bale handling machine;

FIG. 3 is a detailed perspective view showing the power means for moving a bale supporting unit relative to an adjacent side structure of the bale handling machine;

FIG. 4 is a detailed perspective view of the drive means for a feed roller one of which is associated with each supporting unit of the attachment;

DESCRIPTION OF THE INVENTION

Figure 1:
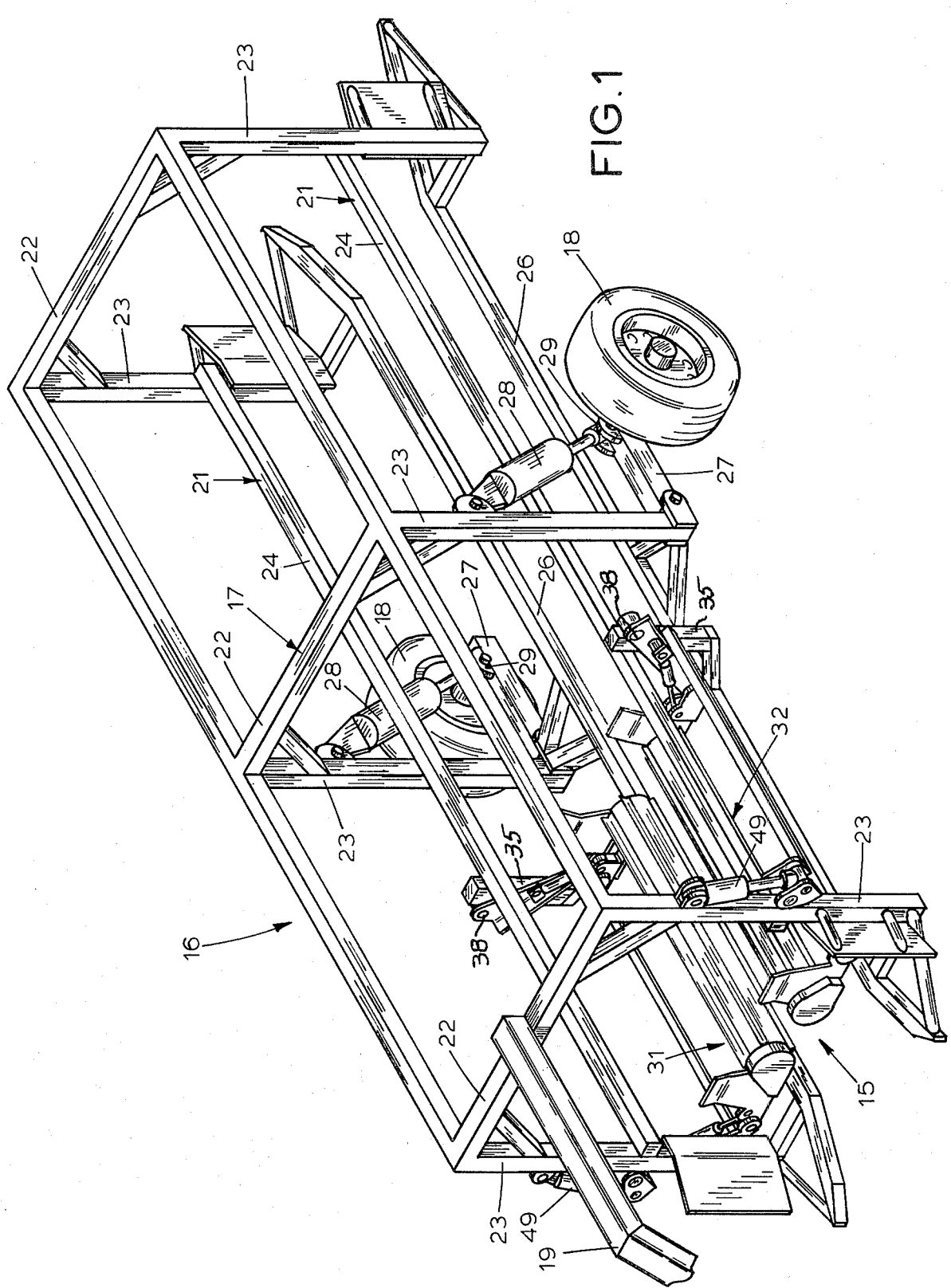
FIG. 1 is a front perspective view of the bale feeding attachment of this invention shown in assembly relation with a bale handling machine.

Referring to FIG. 1 of the drawings, the bale feeding attachment of this invention, indicated generally at 15, is illustrated in assembly relation with a bale handling machine 16 that includes an upstanding, elongated frame 17 adjustably supported for vertical movement on ground wheels 18 and attachable to a tractor or towing vehicle (not shown) by a laterally adjustable goose neck hitch 19. The frame 17 includes a pair of transversely spaced upright side structures 21 connected together only at their upper ends to form longitudinally spaced inverted U-shaped frame sections 22, each of which has a pair of transversely spaced legs or upright beams 23. The upright legs 23 of each side structure 21 are connected together by associated longitudinally extended frame side members 24.

Each side structure 21 laterally inwardly of the lower end thereof carries a longitudinally extended bale supporting ramp member 26. These ramp members 26 are spaced transversely a distance apart to engage opposite sides of the lower portion of a bale when elevated from a position adjacent the ground surface. With a bale resting on the ground, and with the frame 17 in a lowered position, wherein the ramp members 26 ate adjacent the ground, the bale handling machine 16 in a bale loading operation, is advanced to position the bale longitudinally between the ramp members 26. On elevation of the frame 17 relative to the ground wheels 18, the bale is engaged by and supported on the ramp members 26 for transport. Vertical adjustment of the frame 17 is accomplished by means of a swing bar 27, pivotally movable about the axis of an associated ground wheel 18 with its free end pivotally connected to the lower ends of the legs 23 of the intermediate inverted U-shaped frame section 22. On pivotal movement of the swing arms 27, the frame 17 is vertically movable relative to the ground wheels 18. This pivotal movement takes place in response to the actuation of hydraulic cylinder assemblies 28 pivotally interconnected between the legs 23 of the intermediate frame section 22 and the axle assemblies 29 of the wheels 18.

For a more detailed description of the bale handling machine 16, reference is made to U.S. Pat. No. 4,076,137.

The bale feeding attachment 15 (FIG. 1) includes a pair of like bale supporting units 31 and 32, each one of which corresponds to and is mounted on an associated side structure 21 between the forward pair of inverted U-frame sections 22. Since each supporting unit 31 and 32 is identical in construction and operation, only the supporting unit 31 for the left hand side structure 21, as viewed in FIG. 1, will be described in detail with like numerals being applied to the like parts in the supporting unit 32.

The bale supporting unit 31 is comprised of a pair of elongated hinge sections 33 and 34 extended in a side by side relation longitudinally of the main frame 17 and hereinafter referred to, for convenience, as an inner hinge section 33 and an outer hinge section 34, respectively. The outer hinge section 34 (FIG. 2) has a pair of transverse end members 36 of an angle iron construction arranged so as to face each other with one of the legs thereof projected laterally and inwardly of the frame 17. The end members 36 are connected together by transversely spaced longitudinally extended connecting members 37. The outer ends of the transverse members 36 of the hinge section 34 are pivotally supported at 38 on the legs 23 of the front one of the inverted U-frame sections 22 (FIGS. 1 and 2) and on upright posts 35 mounted on a side structure 21 intermediate the forward pair of inverted U-frame sections 22.

The inner hinge section 33 of the supporting unit 31 (FIG. 2) includes a pair of transverse end members 39 of an angle iron shape connected together adjacent the inner ends thereof by a longitudinal brace member 41. Each transverse member 36 is in substantial linear alignment with an associated transverse member 39 with the outer ends of the transverse member 39 pivoted at 42 to the inner adjacent ends of the transverse members 36 to hingedly connect the hinge sections 33 and 34.

Extended between and rotatably mounted on the inner ends of the transverse members 39 of the hinge section 33 is a bale feed roller 43 of a tubular construction provided on its peripheral surface with radially projected circumferentially spaced bale gripping vanes 44. The feed roller 43 (FIG. 4) is driven from a hydraulic motor 46 mounted on a transverse member 39 inwardly of the hinge section 33. A chain and sprocket assembly 47, located exteriorly of the hinge section 33 interconnects the hydraulic motor 46 to the feed roller 43.

The hinge sections 33 and 34 are movable to folded and unfolded positions therefor by a pair of hydraulic cylinder assemblies 48, pivotally interconnected to adjacent pairs of transverse members 36 and 39 of opposite sides of the pivot or hinge connection 42. On retraction of the hydraulic cylinders 48, the hinge sections 33 and 34 are moved or folded toward each other to a retracted position of the supporting unit 31. On extension of the hydraulic cylinders 48, the hinge sections 33 and 34 are moved to their unfolded positions shown in FIG. 2.

The supporting unit 31 is pivotally movable relative to its associated side structure 21 (FIGS. 1, 2 and 3) by a single upright hydraulic cylinder 49 having its upper end pivoted at 51 to an outwardly projected extension 52 on the leg 23 of the front inverted U-frame section 22. The lower end of the hydraulic cylinder assembly 49 is pivoted at 53 to a lateral extension 54 at the outer end of the forward one of the transverse members 36 of the outer hinge section 34. On operation of the hydraulic cylinder assembly 49 the supporting unit 31 is pivotally movable in directions inwardly and outwardly of the frame 17 about the longitudinal axis of the pivot connections 38. This pivotal movement of the supporting unit 31 may take place together with or separately from any relative pivotal movement of the hinge sections 33 and 34 about the hinge axis of the pivots 42.

Figure 5:
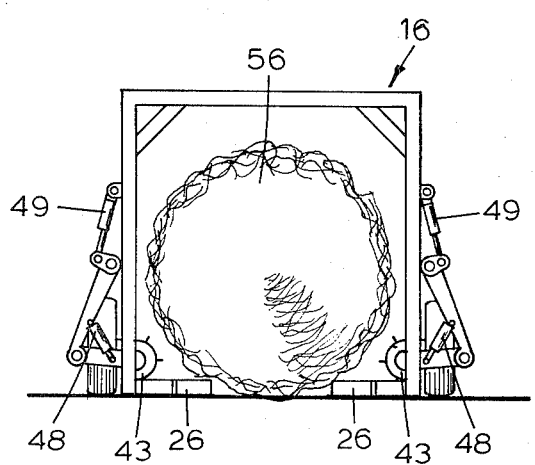
FIG. 5 is a front diagrammatic end view of the bale handling machine with parts thereof illustrated in position to receive a ground supported bale between the ramp members thereof and showing the bale feeding attachment in a retracted or inoperative position.

In a feeding operation, the bale handling machine 16 is manipulated into position for picking up a bale 56 for transport on the ramp members as shown in FIG. 5. When a towing vehicle, such as a pick up truck (not shown) is being used, it is contemplated that the gooseneck hitch 19, illustrated generally in FIG. 1, be adjusted in longitudinal alignment with the machine 16, so that the bale handling machine is backed into position for picking up one or more bales. Again referring to FIG. 5, it is seen that during this manipulation of the machine 16 that the feeding attachment is in its retracted or inoperative position.

Figure 6:
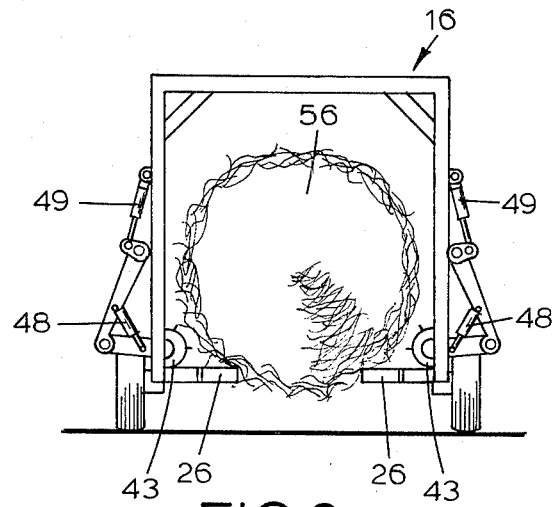
FIG. 6 is illustrated similarly to FIG. 5 and shows a bale to be fed, elevated to a transport position and the bale feeding attachment in its inoperative position.
Figure 7:
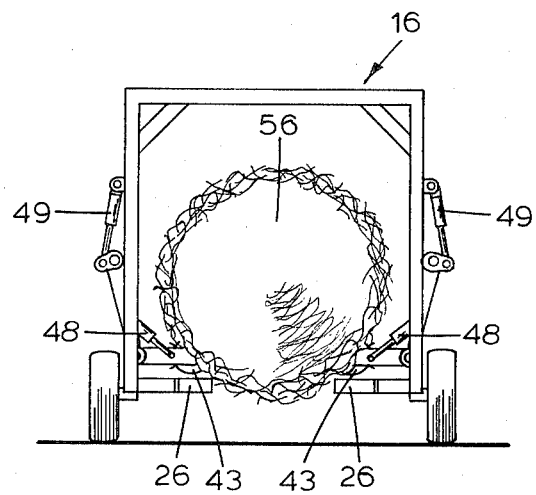
FIG. 7 is illustrated similarly to FIG. 6 and shows the feed rollers on the supporting units of the bale feeding attachment engaged with opposite side portions of the bale.
Figure 8:
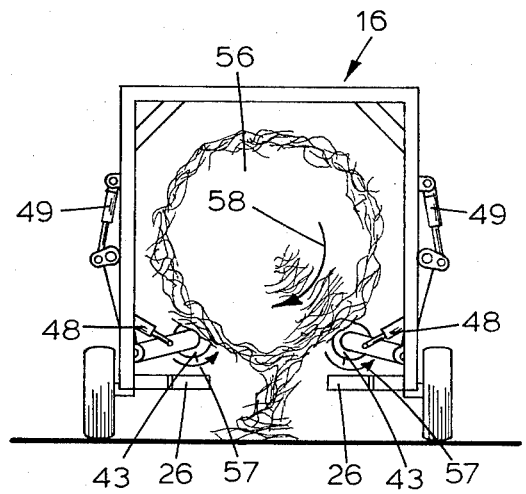
FIG. 8 is illustrated similarly to FIG. 7 and shows the bale to be fed fully supported on the feeding attachment rollers and elevated above and free of the ramp members of the bale handling machine.

On elevation of the main frame 17 to the position therefor in FIG. 6, the bale is engaged by and raised to a transport position on the ramp members 26. During this elevating of the bale, the feeding attachment, in the inoperative position therefor, moves as a unit with the main frame 17. With bale 56 in its transport position, the hydraulic cylinder assemblies 48 and 49 are actuated to move the feed rollers 43 into engagement with transversely opposite bottom portions of the bale 56, at positions above the ramp members 26, as illustrated in FIG. 7. In this respect, it is to be understood that the cylinder assemblies 48 and 49 may be actuated in unison from a single control (not shown) provided on the towing vehicle. When the feed rollers 43 are thus engaged the cylinder assemblies 49 are further extended to move the supporting units 31 and 32 about their respective axes 38 and relative to the main frame 17 to elevate the feed rollers 43 for support of the bale 56 thereon independently of the ramp members 26 as shown in FIG. 8.

Since the bale 56 is formed by rolling of the baled material into a cylindrical shape, it is found that by removing the material in layered sections the material is best available for feeding by being loosely dispersed in a continuous windrow concurrently with the advance of the machine. For this purpose, the rollers 43 are rotated in the same direction, as indicated by the arrows 57, in FIG. 8, to in turn provide for a counter rotation of the bale 56, as shown by the arrow 58. The material is engaged by the gripping vanes 44 and directed between the rollers and ramp members 26 to the ground. To hold the bale 56 on the rollers 43 against movement axially thereof, each hinge section 33 is provided with a pair of upright guide plates 59, each of which is secured to a transverse member 39 (FIG. 2). The plates 59 also function to direct downwardly the baled material removed by the rollers. The above cycle of operations is repeated for each bale feeding. When twine or the like has been wrapped around a bale to maintain its shape for handling or storage purposes, such twine should be removed prior to the bale being picked up by the machine 16.

Figure 9:
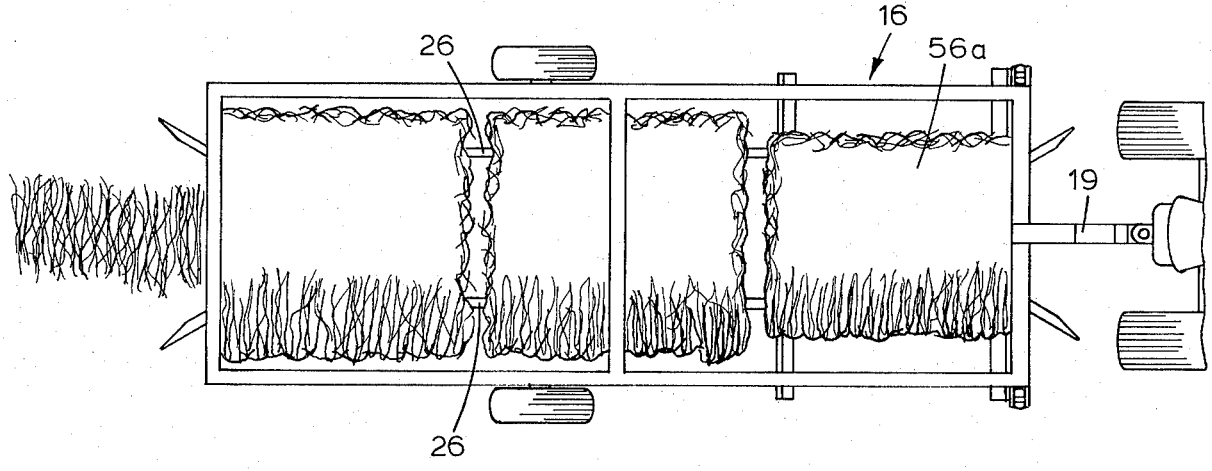
FIG. 9 is a diagrammatic plan view of the bale handling machine in FIG. 1 showing the foremost one of a plurality of bales arranged in a feeding position relative to the bale feeding attachment, and the window being formed by the removed bale material.

When it is necessary to feed more than one bale at a feeding, time may be saved by initially loading the machine 16 with two or more bales 56 (FIG. 9). When a first or front bale 56a is being fed the remaining bales would be held in reserve on the ramp members 26. On completion of the feeding of the front bale 56a, the supporting units 31 and 32 are moved to their inoperative positions and the frame 17 lowered to its position, as shown in FIG. 5. The machine 16 is then moved rearwardly to position the next bale between the supporting units 31 and 32, after which the feeding operation takes place in all ways the same as described above for the feeding of the single bale 56.

Although the invention has been described with respect to a preferred embodiment thereof, it is to be understood that it is not to be so limited since changes and modifications can be made therein which are within the full intended scope of this invention as defined by the appended claims.

I claim:

1. A bale feeding attachment for a machine for handling large round bales that includes a vertically movable elongated main frame having a pair of transversely spaced longitudinal side structures each of which has a ramp member movable to a lowered position along a side of the bottom portion of a ground supported bale and engageable with the bottom side portions when the frame is elevated to support the bale for transport, said attachment comprising:
   (a) a pair of transversely opposite elongated laterally extendible and retractible bale supporting units extended longitudinally of an associated one of said side structures;
   (b) means pivotally supporting the outer side of each supporting unit on an associated side structure for pivotal movement about a first axis extended longitudinally of the main frame to operative and inoperative positions therefor,
   (c) bale engaging feed roller means,
   (d) means rotatably supporting each of said roller means adjacent the inner side of a supporting unit for rotation about a second axis parallel to an associated first longitudinal axis,
   (e) means on said supporting units for laterally extending and retracting said units,
   (f) each supporting unit, when retracted, being movable about an associated first longitudinal axis to an inoperative position therefor, and when a bale is supported in a transport position on said ramp members, being laterally extended and pivotally movable about said first longitudinal axis to the operative position therefor to move the roller means into opposite side portions of the bale to elevate the bale from the ramp members and into a feeding position, and
   (g) means on each supporting unit for rotating an associated roller means to remove material from the bale for discharge downwardly between the ramp members to form a continuous windrow on the ground as the machine is advanced.

2. The bale feeding attachment according to claim 1, wherein:
   (a) the opposite side portions of the bale engaged by the roller means are located above the bale bottom side portions engaged by said ramp members whereby the bale, in the feeding position therefor, is spaced above the ramp members.

3. The bale feeding attachment according to claim 1, wherein:
   (a) the round bale is formed of a roll of fibrous material, and
   (b) said roller means are rotated in the same direction to rotate the bale to remove therefrom, during a feeding operation, sections of said rolled fibrous material.

4. The bale feeding attachment according to claim 3, wherein:
   (a) each of said roller means comprises an elongated cylindrical member, and
   (b) a plurality of circumferentially spaced axially extended radially projected vanes on the peripheral surface of each cylindrical member for removing material from a bale during a feeding operation.

5. The bale feeding attachment according to claim 1, wherein:
   (a) the first longitudinal axis for each supporting unit is located outwardly of an associated side structure.

6. The bale feeding attachment according to claim 1, including:
   (a) means for pivotally moving a supporting unit about the first longitudinal axis therefor including a linearly extendible and retractable power unit pivotally connected to and extended between the outer side of a supporting unit and a laterally outwardly extended portion of an associated side structure.

7. The bale feeding attachment according to claim 1, wherein:
   (a) each supporting unit includes a pair of longitudinally extended hinge sections arranged in a side by side relation, and
   (b) means pivotally connecting together adjacent sides of the hinge sections.

8. The bale feeding attachment according to claim 7, wherein:
   (a) the means on a supporting unit for moving said units to retracted and extended positions therefor, comprises a linearly extendible and retractable power unit pivotally interconnected with and extended between the hinge sections thereof.

* * * * *